Figure 1:
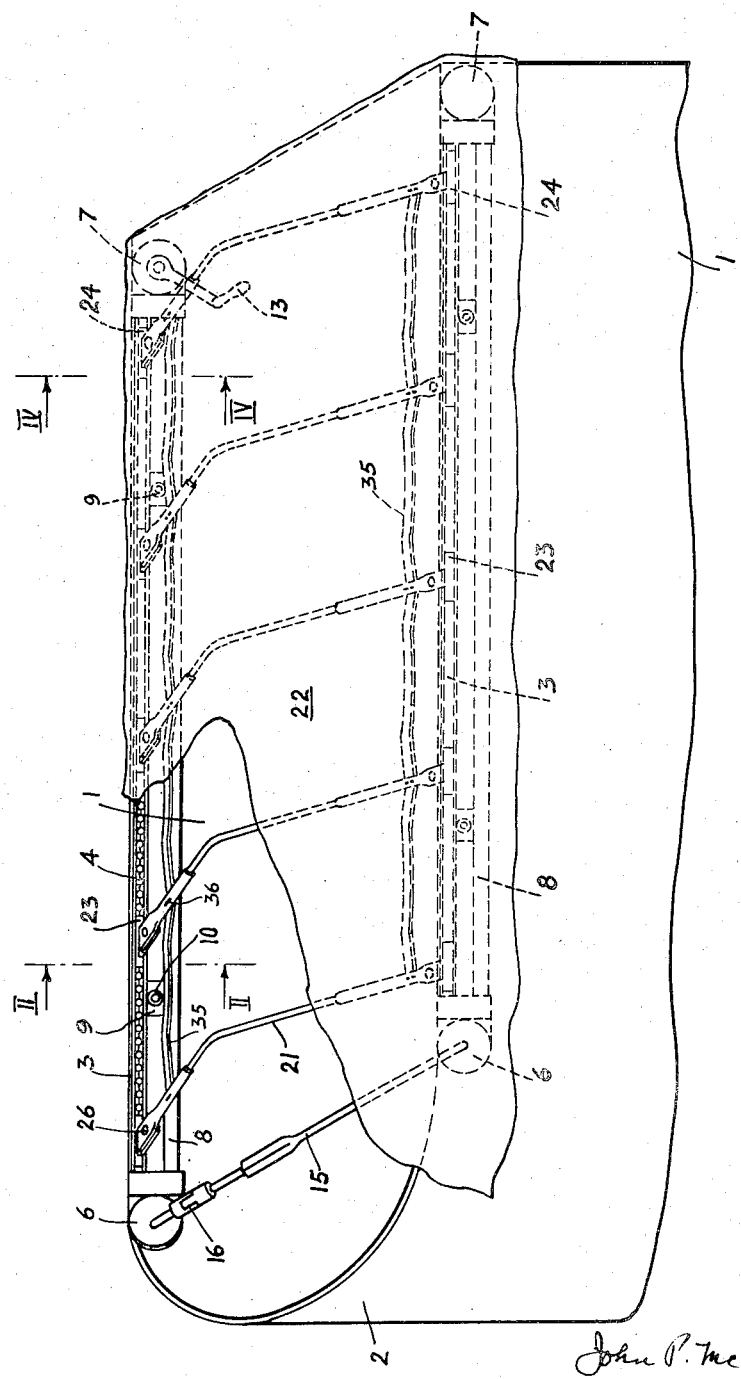

July 3, 1951 J. P. McNAVAGE 2,559,310
COLLAPSIBLE COVER FOR VEHICLES
Filed Feb. 2, 1949 2 Sheets-Sheet 1

INVENTOR.
John P. McNavage
BY
Brown, Critchlow, Flick & Peckham
his ATTORNEYS.

July 3, 1951
J. P. McNAVAGE
2,559,310
COLLAPSIBLE COVER FOR VEHICLES
Filed Feb. 2, 1949
2 Sheets-Sheet 2
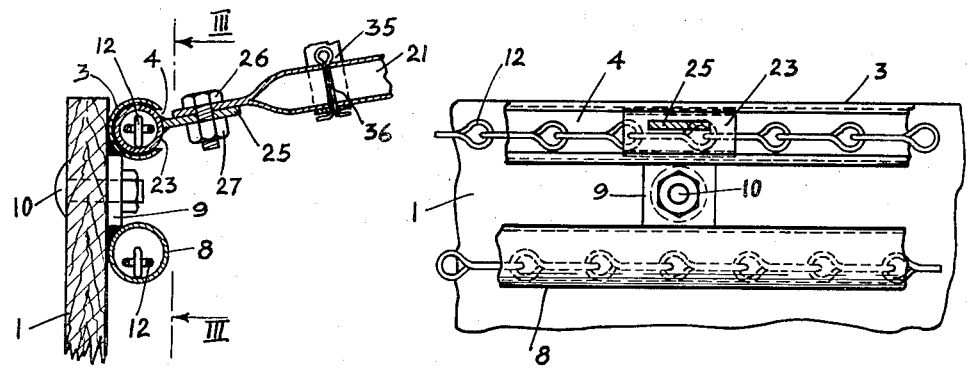
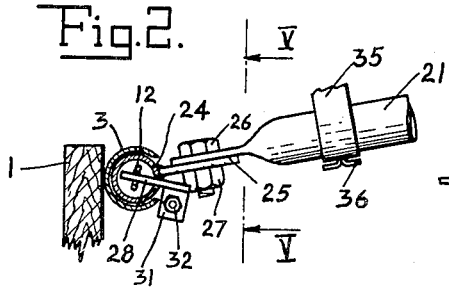
Fig.2.
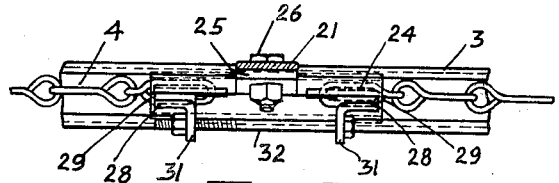
Fig.3.
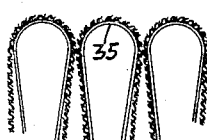
Fig.4.
Fig.5.
Fig.7.
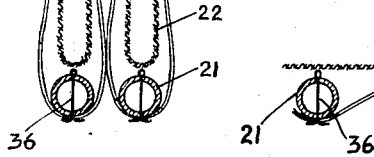
Fig.8.
Fig.6.
INVENTOR.
John P. McNavage
BY Brown, Critchlow, Flick & Peckham
his ATTORNEYS.

Patented July 3, 1951

2,559,310

UNITED STATES PATENT OFFICE 2,559,310

COLLAPSIBLE COVER FOR VEHICLES

John P. McNavage, McKees Rocks, Pa., assignor to Pittsburgh Steel Products Company, Pittsburgh, Pa., a corporation of Pennsylvania Application February 2, 1949, Serial No. 74,138

3 Claims. (Cl. 296—105)

This invention relates to vehicle covers, and more particularly to tarpaulins for covering the bodies of trucks and trailers.

It is among the objects of this invention to provide a vehicle cover which can be extended or collapsed in order to cover or to uncover the vehicle, and in which the folds of a collapsed tarpaulin that is supported by movable bows above the vehicle are lifted above the end portions of the bows to hold the tarpaulin above the load in the vehicle and to keep it from fouling the collapsing mechanism.

In accordance with this invention a pair of spaced horizontal rails are mounted on opposite upright sides of a vehicle, such as a truck body or a truck trailer. A plurality of parallel bows extend across the space between the rails, by which they are movably supported. A tarpaulin is supported above the space between the rails by means of the bows, to which it is attached. A narrow flexible metal strip extends lengthwise of each rail beneath the ends of the bows. These strips are provided with an opening beneath each bow, and the bows are provided with openings aligned with the strip openings. Extending through the aligned openings are fastening members which connect the strips to the bows. Means are provided for moving the bows toward one end of the rails so as to fold the tarpaulin and thereby uncover the vehicle. When the tarpaulin is folded or collapsed in this way, the portions of the metal strips between the bows arch upward between them and lift the tarpaulin folds above the end portions of the bows.

The invention is illustrated in the accompanying drawings, in which Fig. 1 is an isometric view of a truck or trailer body provided with my cover; Fig. 2 is an enlarged fragmentary vertical section taken on the line II—II of Fig. 1; Fig. 3 is a fragmentary side view taken on the line III—III of Fig. 2; and Fig. 4 is an enlarged fragmentary vertical section through an upper rail taken on the line IV—IV of Fig. 1; Fig. 5 is a side view taken on the line V—V of Fig. 4; and Figs. 6, 7, and 8 are vertical sections through some of the bows showing the tarpaulin stretched out straight, partially folded, and completely folded, respectively.

Referring to Fig. 1 of the drawings, the body of a truck or trailer has parallel side walls 1 connected at their front ends by an end wall 2. Extending horizontally along the inner surfaces of the top of each side wall is a tubular rail 3 having a slot 4 extending lengthwise of its inner surface. The ends of each rail are clamped in the upper portions of a pair of sprocket housings 6 and 7. The lower portions of the housings are connected by a pipe 8 parallel to the rail above it. Each rail and adjacent pipe are welded to horizontally spaced vertical plates 9 which are connected by bolts 10 to the inside of the trailer side walls. This arrangement strengthens the side walls. Chains 12 extend through the rails and pipes and around sprockets (not shown) in the housings. One or both of the rear sprocket housings 7 is provided with a crank 13 for turning the sprocket inside of it. The front sprockets are connected by a telescoping shaft 15 having a universal connection 16 at one or both ends.

Extending across the top of the vehicle body is a plurality of arched parallel bows 21, by which a tarpaulin 22 is supported above the body. The bows are formed from sections telescoped together. The ends of these bows are connected to supporting members which are mounted in the rails 3. Each supporting member has a body made from a short pipe section 23 or 24 which is slidably mounted in one of the tubular rails. Projecting from this pipe section through the slot 4 in the rail is a lug 25 (Figs. 2, 3, 4, and 5) provided with a vertical opening through it. The ends of the bows are flattened and provided with openings aligned with the lug openings. Bolts 26 extend down through the aligned openings. Lock nuts 27 are mounted on the lower ends of the bolts, but are not drawn up tightly. Thus, some play is provided between the bows and the supporting lugs so that the bows can pivot and tilt to some extent without jamming their supporting members 23 and 24 in the rails.

The chain 12 in each rail extends through all of the pipe sections 23, but the ends of the chain are fastened to pipe section 24 at the rear end of the rail, so that when the driving sprocket is turned the moving chain will draw rear pipe section 24 forward in the rail and thereby push pipe sections 23 forward. The connection between the ends of the chain and the rear pipe section may be made in various ways. A preferred way of doing it, as shown in Figs. 4 and 5, is to insert hooks 28 in the end links of the chain and then insert the hooks in longitudinal slots 29 in the ends of pipe section 24. The hooks are provided with downwardly projecting lugs 31 through which a bolt 32 extends to hold the two hooks in the pipe section.

It is a feature of this invention that when the sprockets are turned by crank 13 to move the bows 21 toward the front end of the vehicle so that the cover will be collapsed, the resulting tarpaulin folds between the bows will be lifted above the end portions of the bows so that the folds will not interfere with collapsing of the cover nor sag down below the top of the vehicle body and onto the load carried in it. Accordingly, a narrow flexible metal strip 35 extends lengthwise of each rail 3 beneath the adjacent ends of the bows, preferably only a short distance from bolts 26. Each strip is provided with holes directly below the bows, and the bows are provided with holes aligned with the strip holes. Fastening members 36 extend through the aligned holes to connect the metal strips to the bows. Preferably the fastening members, which may be bolts or cotter keys, are not drawn up tightly so that there will be no danger of the strips breaking at their holes. The strips should be made from steel or other suitable metal that has some spring to it.

To assure that the metal strips between the bows will always arch upward when the vehicle cover is collapsed, a short portion of each strip directly below each bow may be provided with a permanent downward curve so that the tendency of the long strip portions between the bows will be to curve upward. If the short arcuate portion is about 1½ inches long and has approximately a six inch radius, it will be satisfactory. Upward arching of the strips between the bows is further guaranteed by making the portions between the bows slightly longer than the distance between the bows when the tarpaulin is stretched taut, as shown in Fig. 6. An additional advantage of this arrangement is that the metal strips will never be stretched out straight and therefore will not prevent the tarpaulin from being stretched tight.

The metal strips are inexpensive and are easy and cheap to install. They take up no appreciable room, but they always lift the tarpaulin out of the way when it is folded, as shown in Figs. 7 and 8. They require no upkeep nor attention.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A vehicle cover comprising a pair of spaced horizontal rails adapted to be mounted on opposite sides of a vehicle, a plurality of parallel bows extending across the space between the rails and movably supported thereby, a tarpaulin supported above said space by the bows to which it is attached, a narrow flexible metal strip extending lengthwise of each rail beneath the adjacent ends of the bows, said strips being provided below each bow with a short downwardly curved portion having a central opening through it, the bows being provided with openings aligned with the strip openings, fastening members extending through said aligned openings to suspend the strips from the bows, and means for moving the bows toward one end of the rails to fold the tarpaulin and thereby uncover the vehicle, while the portions of said metal strips between the bows arch upward between them to lift the tarpaulin folds above the end portions of the bows.

2. A vehicle cover comprising a pair of spaced horizontal rails adapted to be mounted on opposite sides of a vehicle, a plurality of parallel bows extending across the space between the rails and movably supported thereby, a tarpaulin supported above said space by the bows to which it is attached, a narrow flexible metal strip extending lengthwise of each rail beneath the adjacent ends of the bows, said strips being provided with an opening below each bow and the bows being provided with openings aligned with the strip openings, fastening members extending through said aligned openings to suspend the strips from the bows, the distance between the bows when the tarpaulin is taut being less than the length of the metal strips between the bows, and means for moving the bows toward one end of the rails to fold the tarpaulin and thereby uncover the vehicle while the portions of said metal strips between the bows arch upward between them to lift the tarpaulin folds above the end portions of the bows.

3. A vehicle cover comprising a pair of spaced horizontal rails adapted to be mounted on opposite sides of a vehicle, a plurality of parallel bows extending across the space between the rails and movably supported thereby, a tarpaulin supported above said space by the bows to which it is attached, a narrow flexible metal strip extending lengthwise of each rail beneath the adjacent ends of the bows, said strips being provided below each bow with a short downwardly curved portion having a central opening through it, the bows being provided with openings aligned with the strip openings, fastening members extending through said aligned openings and loosely connecting the strips to the bows, the distance between the bows when the tarpaulin is taut being less than the length of the metal strips between the bows, and means for moving the bows toward one end of the rails to fold the tarpaulin and thereby uncover the vehicle while the portions of said metal strips between the bows arch upward between them to lift the tarpaulin folds above the end portions of the bows.

JOHN P. McNAVAGE.

REFERENCES CITED

The following references are of record in the file of this patent:

UNITED STATES PATENTS

| Number | Name | Date |
|---|---|---|
| 1,786,662 | Leather | Dec. 30, 1930 |
| 1,836,191 | Seitz | Dec. 15, 1931 |

FOREIGN PATENTS

| Number | Country | Date |
|---|---|---|
| 136,218 | Switzerland | Jan. 2, 1930 |